United States Patent Office 3,336,611
Patented Aug. 22, 1967

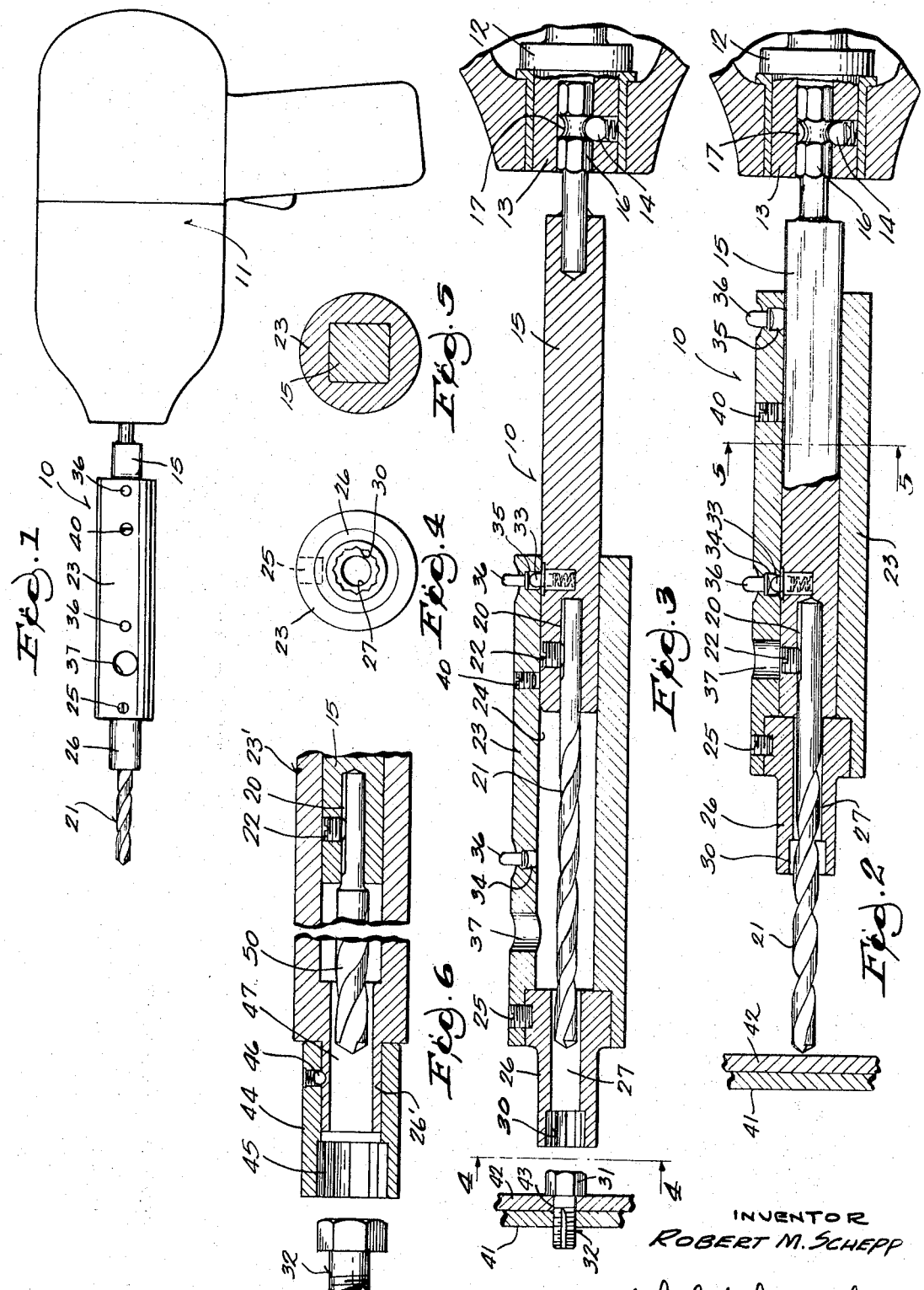

3,336,611
COMBINATION ROTARY TOOLS
Robert M. Schepp, Milwaukee, Wis., assignor of one-half to Henry A. Harry, McHenry, Ill.
Filed Mar. 1, 1966, Ser. No. 530,909
4 Claims. (Cl. 7—14.1)

This invention relates to combination rotary tools.

In certain types of construction and industrial operations, for example, the application of panels, such as roofing and siding sheets, to underlying supports, drilling holes in automobile bodies and engine blocks, etc., it is necessary for a workman to drill numerous holes and to drive fastening screws into the holes.

An object of the invention is to provide an improved and efficient power-driven rotary tool which is suitable for this and other services and which can be quickly and easily adjusted for use as a drill and as a socket wrench.

In accordance with the present invention, a drill is mounted on a mandrel over which a sleeve is telescopically splined. The sleeve has a wrench socket. In its retracted position, the sleeve exposes the drill, whereupon the tool is adapted to drill holes. In its advanced position, the wrench socket end of the sleeve extends beyond the drill and adapts the tool to function as a nut runner. Suitable detents are provided to selectively hold the sleeve in either one of its advanced and retracted positions.

Other objects, features, and advantages of the invention will appear from the following disclosure in which:

FIG. 1 is a side elevational view of a combination rotary tool of the invention mounted on an electric motor-driven pistol grip tool such as a conventional power head of an impact-type nut runner.

FIG. 2 is a longitudinal sectional view of the tool as it appears when in use as a drill.

FIG. 3 is a view similar to FIG. 2, but showing the tool when in use as a socket wrench.

FIG. 4 is an outer end view of the tool, viewed on the line 4—4 of FIG. 3.

FIG. 5 is a transverse section view of the tool, taken generally on the line 5—5 of FIG. 2.

FIG. 6 is a fragmentary longitudinal section of a modified embodiment.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawing, the numeral 10 designates generally a rotary tool constructed in accordance with the invention, and 11 designates a conventional hand-held power head, such as an electrically energized or air-operated impact-type nut runner for driving the tool. The power head includes a rotary output shaft 12 with an axial socket 13 of hexagonal cross section and the usual spring-pressed detent balls 14.

The tool comprises a mandrel 15 of square or other non-circular cross section having at one end a reduced axial driving shank 16 of polygonal cross section adapted to be detachably fitted into the power head socket 13, the extension having an annular groove 17 to receive the detent balls 14. The opposite or front end of the mandrel 15 is provided with an axial cylindrical socket 20 adapted to snugly receive therein a drill bit 21, the bit being detachably clamped in the socket by a radial set screw 22 in the mandrel.

The sleeve 23 is slidably and telescopically mounted on the mandrel 15 for axial displacement between a retracted position shown in FIG. 2 and an advanced position shown in FIG. 3. Sleeve 23 has an axial passage 24 therethrough of square cross section in which the mandrel slidably fits to provide a splined driving connection to the sleeve. The front end portion of the sleeve 23 has removably secured therein, as by one or more set screws 25, a tubular extension or head 26 having an axial passage 27 receiving the drill bit 21. The drill bit projects forwardly beyond the head 26 when the sleeve is retracted, as shown in FIG. 2. At its front end, the axial passage 27 is formed with a wrench socket 30 of hexagonal or other polygonal shape adapted to engage the head 31 of a screw 32, FIG. 3, such as of the self-tapping type, when the sleeve 23 is in its advanced position.

Tubular extension member 26 is readily replaceable with a like member having a different configuration of socket 30, thus to adapt the tool to drive screws with specifically different types and shapes of heads.

The sleeve 23 is releasably retained in its retracted drill-exposing position of FIG. 2 by a suitable detent, such as a spring-pressed detent pin 33 mounted in the mandrel 15 and engageable in a radial bore 34 formed in the sleeve near its front end. The sleeve is releasably retained in its advanced wrench-exposing position by the same detent 33, engageable in a radial bore 35 formed in the sleeve near its rear end. The respective bores 33, 35 are desirably provided with detent depressing push pins 36 which are captive in bores 33, 35. Any other suitable detents can be used to releasably lock the sleeve 23 in its advanced and retracted positions. Those shown herein are merely by way of example.

The sleeve 23 is also provided with a radial opening 37 which registers with drill-clamping set screw 22 when the sleeve is in FIG. 2 retracted position, thus affording access to this screw to facilitate replacement of the drill. The sleeve is also optionally provided with a radial set screw 40 releasably engageable with the mandrel so as to releasably lock the sleeve in various positions of adjustment along the mandrel 15 to adapt the front end of the sleeve extension 26 to form an adjustable drill depth stop, when this function is desired.

In the use of the tool, the driving shank 16 of the mandrel 15 is fitted into the socket 13 of the power head 11, so as to provide a driving connection for the tool. With the tool sleeve 23 in retracted position on the mandrel, as shown in FIGS. 1 and 2, the drill bit 21 is exposed in position to form a hole 43 in the structures 41, 42 to be fastened. After drilling the hole 43 and withdrawing the tool, sleeve 23 is slid forwardly to its advanced position of FIG. 3, covering the projecting end of the drill bit 21 and exposing the nut socket 30 in the sleeve extension 26 in readiness to drive the screw 32 in the hole 43 formed in the structure.

A modified embodiment of the invention is shown in FIG. 6 in which the sleeve 23' is provided with an integral tubular extension 26' desirably polygonal in external cross section to key with an adapter 44 having a wrench socket 45. A spring-pressed detent 46 releasably holds the adapter on the extension 44. In this embodiment, the opening 47 through the extension 44 is somewhat larger than opening 27 of the embodiment in FIGS. 2 and 3, to pass a somewhat larger drill 50. The shank of drill 50 is desirably the same size as the shank of drill 21, to fit into socket 20 in mandrel 15.

I claim:

1. A tool for drilling a hole in a workpiece and driving a headed screw therein, comprising, in combination, a rotatable mandrel of non-circular cross section having one end drivingly engageable in a power unit, the other end of said mandrel having a socket adapted to have a drill bit removably secured therein, a sleeve telescopically slidable on said mandrel in splined driving engagement therewith and movable between retracted and advanced positions, a wrench socket head attached to the end of said sleeve and having an axial opening adapted to receive the drill bit therethrough, said sleeve when in retracted position exposing said drill bit for effecting a drilling operation, and said sleeve when in advanced position having its wrench socket projecting beyond said drill bit and adapted to engage the head of the screw for driving the screw into the hole.

2. The tool of claim 1 in which the mandrel and sleeve are provided with interacting detents to define the advanced and retracted positions of the sleeve.

3. The tool of claim 1 in which the end of the sleeve is provided with a releasable coupling for the wrench socket head, whereby heads with different size sockets may be attached thereto.

4. The tool of claim 1 in which the drill bit socket has a set screw to hold the drill bit therein, said sleeve having an access hole registrable radially with said set screw for access thereto to replace the drill.

References Cited

UNITED STATES PATENTS

| | | | |
|---|---|---|---|
| 1,318,088 | 10/1919 | Klein | 81—3.02 |
| 1,333,437 | 3/1920 | Monroe | 145—51 |
| 1,677,473 | 7/1928 | Gast | 81—3.02 |
| 3,049,952 | 8/1962 | Wrigley | 81—55 |

FOREIGN PATENTS

| | | |
|---|---|---|
| 1,222,942 | 1/1960 | France. |
| 414,887 | 8/1934 | Great Britain. |

WILLIAM FELDMAN, *Primary Examiner.*

R. V. PARKER, JR., *Assistant Examiner.*